United States Patent
Atwater

(10) Patent No.: US 9,958,707 B2
(45) Date of Patent: May 1, 2018

(54) SYSTEMS AND METHODS FOR IMPLEMENTING ELECTRICALLY TUNABLE METASURFACES

(71) Applicant: California Institute of Technology, Pasadena, CA (US)

(72) Inventor: Harry A. Atwater, South Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days. days.

(21) Appl. No.: 15/124,017

(22) PCT Filed: Mar. 6, 2015

(86) PCT No.: PCT/US2015/019315
§ 371 (c)(1),
(2) Date: Sep. 6, 2016

(87) PCT Pub. No.: WO2015/187221
PCT Pub. Date: Dec. 10, 2015

(65) Prior Publication Data
US 2017/0090221 A1    Mar. 30, 2017

Related U.S. Application Data

(60) Provisional application No. 61/948,810, filed on Mar. 6, 2014.

(51) Int. Cl.
*H01Q 15/02*    (2006.01)
*G02F 1/00*     (2006.01)
*G02F 1/01*     (2006.01)

(52) U.S. Cl.
CPC .......... *G02F 1/0018* (2013.01); *G02F 1/0121* (2013.01); *G02F 2202/30* (2013.01)

(58) Field of Classification Search
CPC ... G02F 1/0018; G02F 1/0121; G02F 2202/30
(Continued)

(56) References Cited

U.S. PATENT DOCUMENTS

2001/0050654 A1    12/2001    Killen et al.
2006/0119518 A1     6/2006    Ohmi et al.
(Continued)

FOREIGN PATENT DOCUMENTS

WO    2015187221 A2    12/2015

OTHER PUBLICATIONS

International Preliminary Report on Patentability for International Application PCT/US2015/019315, Report dated Sep. 6, 2016, dated Sep. 15, 2016, 5 Pgs.

(Continued)

*Primary Examiner* — William Choi
(74) *Attorney, Agent, or Firm* — KPPB LLP

(57) ABSTRACT

Systems and methods in accordance with embodiments of the invention implement electrically tunable metasurfaces. In one embodiment, an electrically tunable metasurface reflectarray includes: a mirrored surface; a conductive layer; a dielectric layer; where the conductive layer and the dielectric layer are in direct contact, and thereby define a conductor-dielectric interface; a plurality of subwavelength antenna elements; and an electrical power source configured to establish a potential difference between at least one subwavelength antenna element and the mirrored surface; where a potential difference between a subwavelength antenna element and the mirrored surface applies an electric field to a corresponding region of the electrically tunable metasurface reflectarray; where any applied electric fields in conjunction with the geometry and the material composition of each of the subwavelength antenna elements, the conductive layer, and the dielectric layer, enable the electrically (Continued)

tunable metasurface reflectarray to measurably augment the propagation characteristics of incident electromagnetic waves.

22 Claims, 10 Drawing Sheets

(58) Field of Classification Search
USPC .................................. 359/263; 343/909, 912
See application file for complete search history.

(56) References Cited

U.S. PATENT DOCUMENTS

| | | |
|---|---|---|
| 2007/0132645 A1 | 6/2007 | Ginn et al. |
| 2008/0136563 A1* | 6/2008 | Duwel ................. H03H 9/0095 333/186 |
| 2009/0322636 A1 | 12/2009 | Brigham et al. |
| 2013/0082899 A1 | 4/2013 | Gomi |

OTHER PUBLICATIONS

International Search Report and Written Opinion for International Application No. PCT/US2015/019315, Search completed Nov. 30, 2015, dated Nov. 30, 2015, 7 Pgs.
Boltasseva et al., "Low-Loss Plasmonic Metamaterials", Science, Jan. 21, 2011, vol. 331, pp. 290-291, doi:10.1126.science.1198258.
Feigenbaum et al., Nano Letters, May 18, 2010, vol. 10, 2111-2116.
Naik et al., Optical Materials Express, Sep. 6, 2011, vol. 1, 1090.
Pryce et al., "Highly Strained Complaint Optical Metamaterials with Large Frequency Tunability", Nano Lett., Sep. 21, 2010, vol. 10, pp. 4222-4227, DOI: 10.102/nl102684.
Yu et al., "Light Propagation with Phase Discontinuities: Generalized Laws of Reflection and Refraction", Science, Oct. 21, 2011, vol. 334 (6054), pp. 333-337, doi: 10.1126/science.1210713.

\* cited by examiner

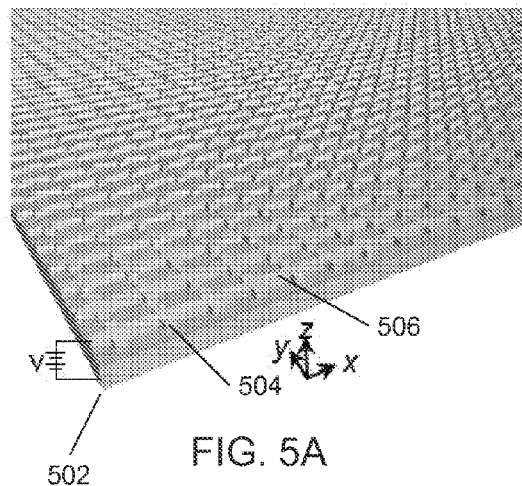
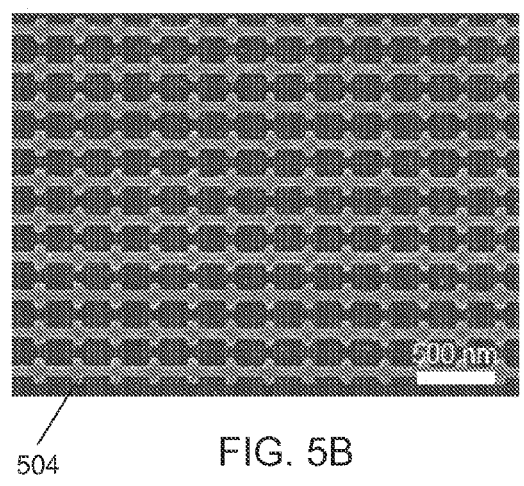
FIG. 5A
FIG. 5B
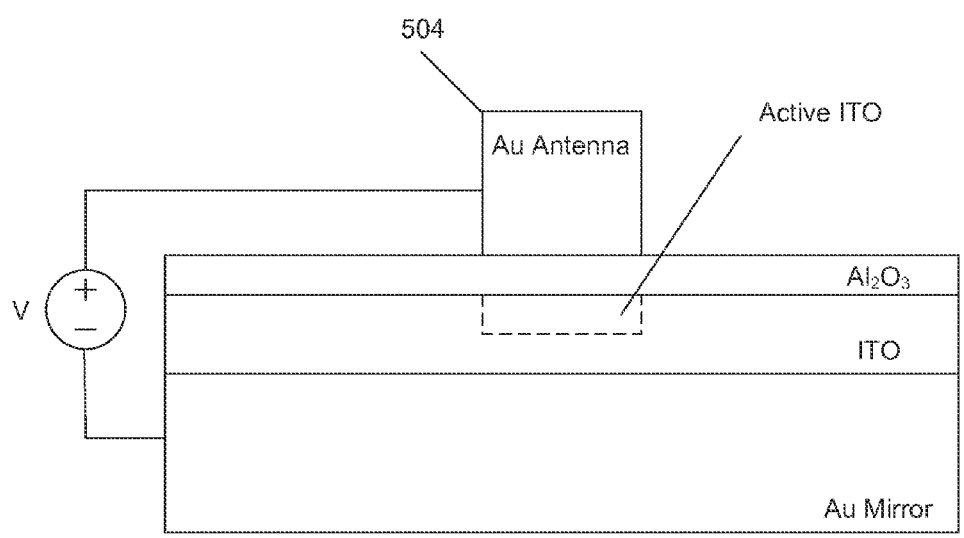
FIG. 5C

SYSTEMS AND METHODS FOR IMPLEMENTING ELECTRICALLY TUNABLE METASURFACES

CROSS-REFERENCE TO RELATED APPLICATIONS

The current application claims priority to U.S. Provisional Application No. 61/948,810, filed Mar. 6, 2014, the disclosure of which is incorporated herein by reference.

STATEMENT OF FEDERAL FUNDING

This invention was made with government support under FA9550-12-1-0488 & FA9550-12-1-0024 awarded by the Air Force. The government has certain rights in the invention.

FIELD OF THE INVENTION

The present invention generally relates to the implementation of electrically tunable metasurfaces.

BACKGROUND

Metamaterials are generally understood to be artificially synthesized materials that are typically characterized by a repeating pattern of structural elements that have characteristic lengths on the order of less than the wavelength of the waves that they are meant to impact. For example, 'photonic metamaterials' (also known as 'optical metamaterials'), which are meant to control the propagation of visible light, include structural elements that have characteristic lengths on the order of nanometers—by contrast, the wavelength of visible light is on the order of hundreds of nanometers. Much research has been devoted to developing such materials that have highly counterintuitive, but practical, optical characteristics—for example, metamaterials having negative indices of refraction have been developed and are the subject of much study.

'Metasurfaces' can be thought of as two-dimensional metamaterials insofar as they are characterized by a repeating pattern of subwavelength structures, and they can offer many of the same advantages as metamaterials. Indeed, metasurfaces can even be advantageous relative to metamaterials in many respects. For example, metasurfaces can be made to more efficiently transmit light as compared to metamaterials.

SUMMARY OF THE INVENTION

Systems and methods in accordance with embodiments of the invention implement electrically tunable metasurfaces. In one embodiment, an electrically tunable metasurface reflectarray includes: a mirrored surface; a conductive layer; a dielectric layer; where the conductive layer and the dielectric layer are in direct contact, and thereby define a conductor-dielectric interface; a plurality of subwavelength antenna elements; and an electrical power source configured to establish a potential difference between at least one subwavelength antenna element and the mirrored surface; where a potential difference between a subwavelength antenna element and the mirrored surface applies an electric field to a corresponding region of the electrically tunable metasurface reflectarray; where any applied electric fields in conjunction with the geometry and the material composition of each of the subwavelength antenna elements, the conductive layer, and the dielectric layer, enable the electrically tunable metasurface reflectarray to measurably augment the propagation characteristics of incident electromagnetic waves.

In another embodiment, an electrically tunable metasurface further includes a second electrical power source configured to establish a second potential difference between at least one other subwavelength antenna element and the mirrored surface.

In yet another embodiment, the electrical power source is configured to establish a plurality of potential differences between a plurality of subwavelength antenna elements and the mirrored surface.

In still another embodiment, any applied electric fields in conjunction with the geometry and the material composition of each of the subwavelength antenna elements, the conductive layer, and the dielectric layer, enable the electrically tunable metasurface reflectarray to measurably augment the propagation characteristics of incident electromagnetic waves falling within at least some portion of the electromagnetic spectrum characterized by wavelengths of less than 10 µm.

In still yet another embodiment, the at least some portion of the electromagnetic spectrum is characterized by electromagnetic waves having wavelengths less than or equal to wavelengths approximately corresponding with those of near infrared electromagnetic waves.

In a further embodiment, when a region of the electrically tunable metasurface is exposed to an electric field, reflected incident electromagnetic waves falling within the at least some portion of the electromagnetic spectrum exhibit a phase shift based on the magnitude of the applied electric field.

In a still further embodiment, the at least some portion of the electromagnetic spectrum is characterized by electromagnetic waves having wavelengths approximately corresponding with those of near infrared electromagnetic waves.

In a yet further embodiment, the at least some portion of the electromagnetic spectrum is characterized by electromagnetic waves having wavelengths less than or equal to wavelengths approximately corresponding with those of visible light.

In a still yet further embodiment, the at least some portion of the electromagnetic spectrum is characterized by electromagnetic waves having wavelengths approximately corresponding with those of visible light.

In another embodiment, the conductive layer includes one of: a nitride based material; silver; copper; gold; aluminum; an alkali metal; an alloy; a transparent conducting alloy; and graphene.

In still another embodiment, the conductive layer comprises indium tin oxide.

In yet another embodiment, the dielectric layer includes a dielectric oxide.

In still yet another embodiment, the dielectric layer comprises aluminum oxide.

In a further embodiment, the mirrored surface includes gold; and at least one of the plurality of subwavelength antenna elements includes gold.

In a yet further embodiment, when a region of the electrically tunable metasurface reflectarray is exposed to an electric field, the charge carrier concentration at the conductor-dielectric interface within that region is altered based on the magnitude of the applied electric field, and this alteration causes a phase shift in reflected incident electromagnetic waves falling within the at least some portion of the electromagnetic spectrum.

In a still further embodiment, a variation in charge carrier concentration from $1\times10^{19}$ cm$^{-3}$ to $1\times10^{21}$ cm$^{-3}$ is sufficient to shift the phase of reflected incident electromagnetic waves falling within the at least some portion of the electromagnetic spectrum by at least $2\pi$.

In a still yet further embodiment, at least one of the plurality of subwavelength antenna elements conforms to a rod-shaped geometry.

In another embodiment, at least one of the plurality of subwavelength antenna elements conforms to a V-shaped geometry.

In still another embodiment, at least one of the plurality of subwavelength antenna elements conforms to a split ring geometry.

In yet another embodiment, at least two of the plurality of subwavelength antenna elements are connected to the same conductive element, which itself is connected to the electrical power source.

In still yet another embodiment, rows of subwavelength antenna elements are connected to a respective conductive element, which themselves are connected to the electrical power source.

BRIEF DESCRIPTION OF THE DRAWINGS

FIGS. 5A-5C illustrate an electrically tunable metasurface that includes an array of gold subwavelength antenna elements, an ITO-Al$_2$O$_3$ interface, and a gold mirror, where rows of subwavelength antenna elements are held at the same electric potential in accordance with certain embodiments of the invention.

FIGS. 9A-9B illustrate how reflectance and phase shift can vary as a function of charge carrier concentration for

DETAILED DESCRIPTION

Figure 1A:
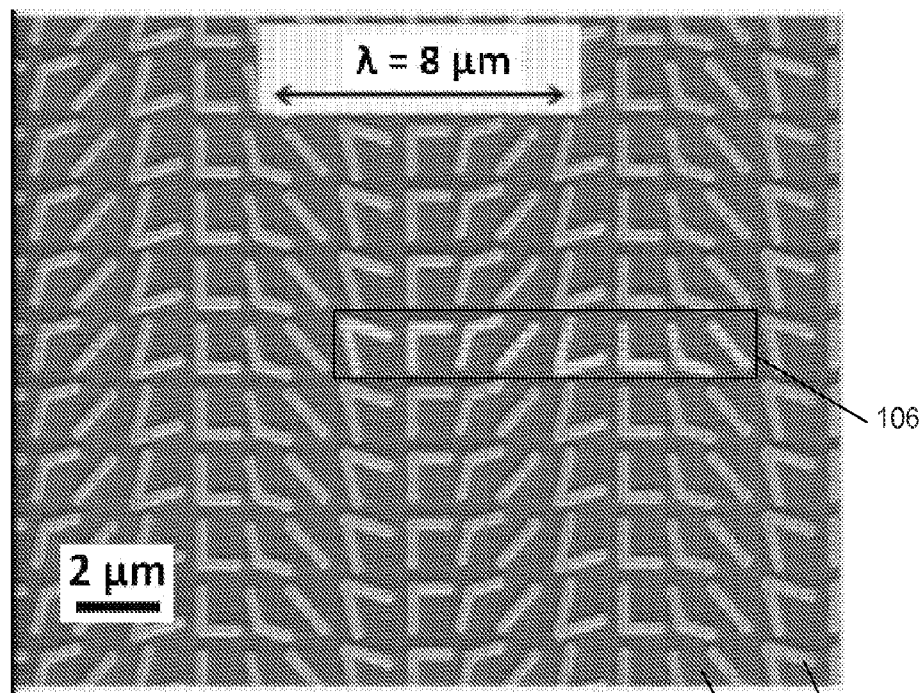
FIGS. 1A-1B illustrate a prior art metasurface.

Turning now to the drawings, systems and methods for implementing electrically tunable metasurfaces are illustrated. In many embodiments, an electrically tunable metasurface includes an array of subwavelength antenna elements with complex dielectric functions that are electro-optically tunable to control the phase and/or amplitude of reflected and/or transmitted electromagnetic waves including (but not limited to) electromagnetic waves having wavelengths on the order of those of visible light and/or near-infrared (near-IR) light. In numerous embodiments, such metasurfaces are used to implement optical beamformers.

Metamaterials and metasurfaces are understood to possess vast potential for the robust control of electromagnetic waves. However, much of the developments in this area have been confined to metasurfaces that are largely fixed in the electromagnetic responses that they generate, and that are configured to operate over a limited bandwidth. Consequently, there has been much interest in developing 'tunable' metamaterials/metasurfaces that can have the electromagnetic responses that they generate dynamically controlled post-fabrication. In particular, there has been significant interest in being able to develop tunable metamaterials/metasurfaces that are configured to manipulate electromagnetic waves that have wavelengths corresponding with near infrared waves as well as visible light. In general, it would be useful to be able control the reflections and refractions emanating from electromagnetic waves having wavelengths at or below those of near infrared waves. Thus, for instance, "Highly Strained Compliant Optical Metamaterials with Large Frequency Tunability," to Pryce et al. (*Nano Lett.* 2010, 10. 4222-4227, DOI:10.1021/nl102684), discloses compliant metamaterials having a wavelength tunability of approximately 400 nm, greater than the resonant line width at optical frequencies, using high-strain mechanical deformation of an elastomeric substrate to controllably modify the distance between the resonant elements. The disclosure of "Highly Strained Compliant Optical Metamaterials with Large Frequency Tunability" is hereby incorporated by reference in its entirety, especially as it pertains to deforming metamaterials so as to tune their electromagnetic response characteristics.

Notwithstanding this demonstration, in many practical applications, it may not be desirable to have to rely on mechanical deformation in order to achieve desired electromagnetic response characteristics. Moreover, in many instances it is desirable to exert even more nuanced control of the electromagnetic response of a metasurface. For instance, in many instances, it may be desirable to be able to locally control the electromagnetic response characteristics within a metasurface. Additionally, it is worth mentioning that many of the metasurfaces that are configured to operate on visible light that have been developed so far are optically inefficient. For example, many existing optical metasurfaces have optical efficiencies of less than 10%. As can be appreciated, it can be desirable to implement metasurfaces having improved optical efficiencies. While much of the discussion that follows describes metamaterials that are used to reflect light to achieve increased optical efficiencies, it should be appreciated that similar techniques can be utilized to create refractive metasurfaces with dynamically tunable refractive indices.

Accordingly, in many embodiments of the invention, tunable metasurfaces that are configured to respond to electromagnetic waves having wavelengths less than 10 μm—e.g. including near infrared and visible light—are implemented, where localized electric fields can be used to manipulate the localized electromagnetic response characteristics of the metasurfaces. Additionally, many embodiments of the invention implement metasurfaces having improved optical efficiencies. As can be appreciated, such robust metasurfaces can be practically implemented in any of a variety of applications. For example, in many embodiments, optical beamforming metasurfaces are implemented. In a number of embodiments, the described robust metasurfaces are utilized to realize holography. In several embodiments, the described robust metasurfaces are utilized to realize animated holography. In number of embodiments, the described robust metasurfaces are used to implement cloaking devices. Indeed, the described robust metasurfaces can be implemented in any of a variety of applications that can benefit from such robust wave front shaping ability. Before a detailed description of the structure of the metasurfaces is presented, the general understanding of the physics underlying metasurfaces phenomena is now presented below.

Generally Understood Metasurface Physics

Before discussing the tunable metasurfaces that are the subject of the instant application, it is useful to review some of the generally understood physics that govern metasurfaces phenomena. When discussing metamaterials/metasurfaces phenomena, the generalized version of Snell's laws are typically used to model the electromagnetic response. The generalized version of Snell's law for refraction can be stated as follows:

$$n_t \sin\theta_t - n_i \sin\theta_i = \left(\frac{\lambda_0}{2\pi}\right)\frac{d\phi}{dx}$$

where:
$n_i$ is the index of refraction for a first medium through which the incident light is transmitted through;
$n_t$ is the index of refraction for a second medium through which the incident light is transmitted through;
$\theta_i$ is the angle of incidence of the incoming light;
$\theta_t$ is the angle of refraction of the refracted light as it passes through the second medium;

$$\frac{d\phi}{dx}$$

characterizes the change in the phase of the light wave across the plane of incidence; and
$\lambda_0$ is the wavelength of the incident light.
Similarly, the generalized version of Snell's law for reflection can be stated as follows:

$$\sin\theta_r - \sin\theta_i = \left(\frac{\lambda_0}{2\pi n_i}\right)\frac{d\phi}{dx}$$

using the same conventions as before, and where $\theta_r$ is the angle of reflection of the reflected light. In many circles, the value $(d\phi/dx)$ is considered to be a wave-vector. Note also that many have characterized the generalized versions of Snell's laws as instances of the conservation of momentum.

A discussion of the generalized version of Snell's laws can be found in "Light Propagation with Phase Discontinuities; Generalized Laws of Reflection and Refraction," to Yu et al. (*Science.* 2011 Oct. 21; 334 (6054): 333-7. doi: 10.1126/science.1210713.). The disclosure of "Light Propagation with Phase Discontinuities; Generalized Laws of Reflection and Refraction" is hereby incorporated by reference in its entirety, especially as it pertains to the generalized versions of Snell's laws. The refractions and reflections that emanate because of a change in phase across an incident plane can be referred to as 'anomalous refractions' and 'anomalous reflections' respectively.

In any case, it is seen from the generalized versions of Snell's laws that the angles of refraction and reflection from an incident light source are functions of changes in phase across the incident plane. Metasurfaces generally rely on this phenomenon in their operation. Generally, metasurfaces utilize resonators—often in the form of subwavelength antenna elements—to cause a change (typically an abrupt change) in the phase of incident light. Such resonators can also be used to alter the amplitude and polarization of the incident light. In general, the phase shift (and amplitude and polarization response) caused by a subwavelength antenna element is a function of the geometry of the antenna. Metasurfaces thus far have implemented antenna elements in a variety of forms including, but not limited to: v-shaped antenna elements, rods, and split ring resonators. As alluded to above, the antenna elements typically have dimensions that are much smaller than the wavelengths of the electromagnetic waves that they are meant to impact.

It should be mentioned that metasurfaces often realize their unique properties because of surface plasmon phenomena. In general, surface plasmons, which are charge oscillations of free electrons near a metal surface, result from the interaction with light and matter, and are typically generated at a conductor-dielectric interface. Under specific conditions, light couples with the surface plasmons to create self-sustaining, propagating electromagnetic waves, which are known as surface plasmon polaritons. The creation of these surface plasmon polaritons often relates to the unique optical properties that can be achieved with metasurfaces. Such metasurfaces can be referred to as plasmonic metasurfaces.

Figure 1B:
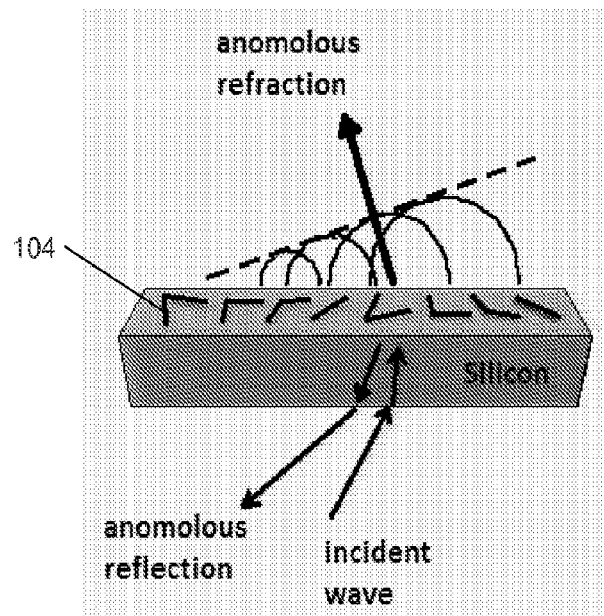

FIGS. 1A and 1B illustrate a prior art metasurface including phased array antenna elements that demonstrate an ability to shift the phase of incident infrared electromagnetic waves by any desired extent. In particular, FIG. 1A depicts a metasurface 102 including a plurality of v-shaped phased array antenna elements 104. The highlighted v-shaped antenna elements 106 represent the various antenna elements that are used to demonstrate '2π phase coverage.' In other words, each of the depicted subwavelength antenna elements basically has the effect of shifting the phase of the incident infrared electromagnetic wave by a certain amount, with the extent of the shift being based on the geometry of the antenna element. Accordingly, the depicted 8 subwavelength antenna elements 106 have different geometries, and thereby shift the incoming waves by different amounts. In the illustrated example, the varying geometries demonstrate an ability to shift the phase of the incident waves by any amount from 0 to 2π, with the shift being based on the geometry of the antenna element. Note that the antenna elements have lengths of approximately 2 μm—and they are thereby configured to impact infrared wavelengths (e.g. λ=8 μm). Importantly, as the geometry of the antenna elements is fixed, the respective phase shifts that they cause are also fixed post-fabrication.

FIG. 1B illustrates how incident infrared electromagnetic waves interact with the antenna array. Note that the propagation direction changes, which is a phenomena not seen in nature.

Figure 2A:
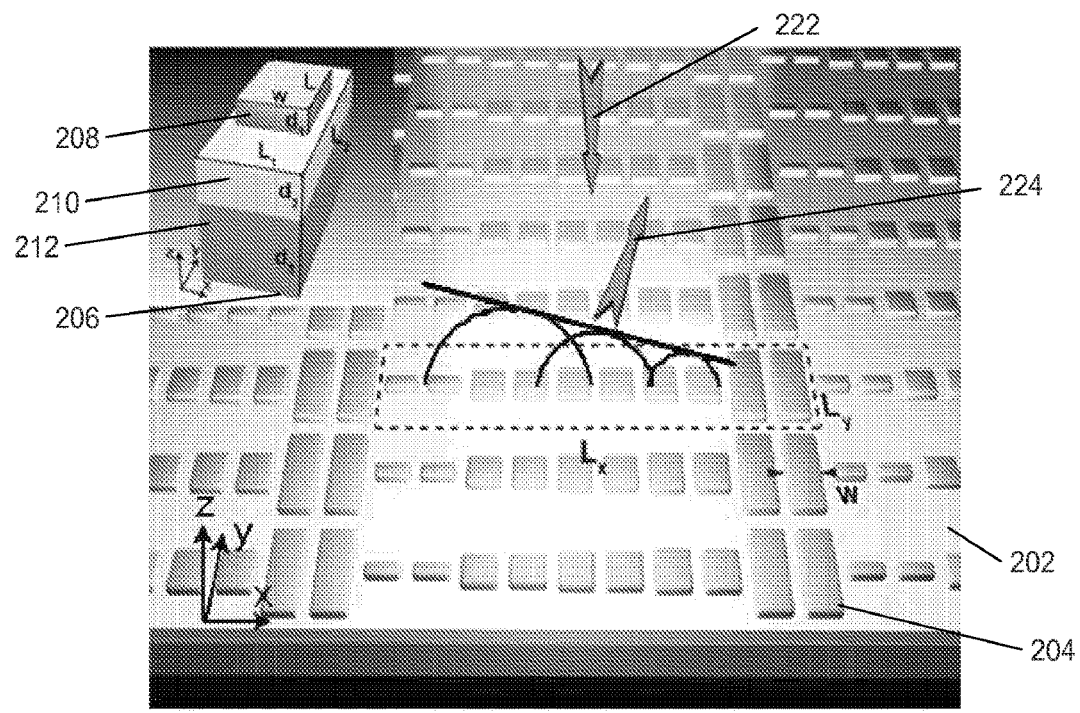
FIGS. 2A-2B illustrate a prior art metasurface reflectarray and its reflection angles as a function of angles of incidence.
Figure 2B:
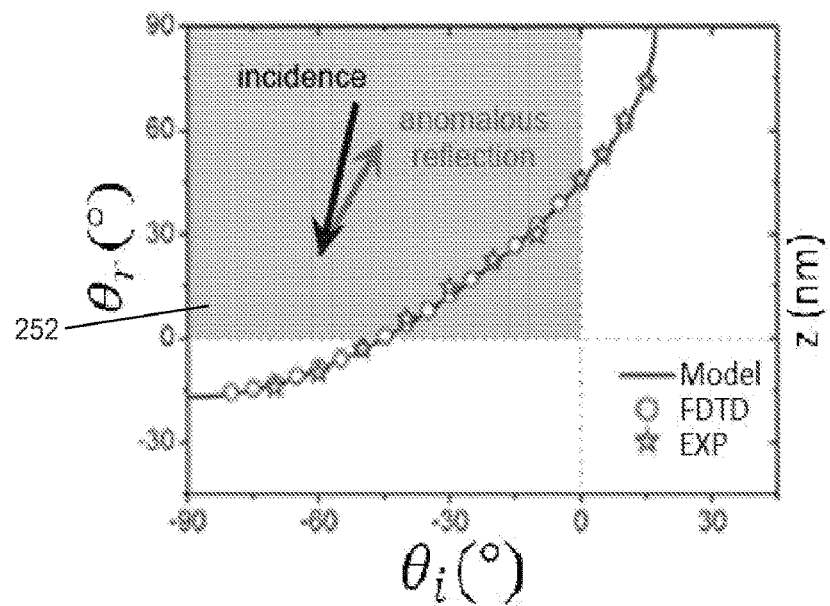

The above-described physical phenomena underlying metasurface operation can also be seen in metasurface reflectarrays, where the principle interest regards reflected light. Typically, such metasurfaces are bounded by a mirror surface, which effectively 'cancels' the transmitted light. Notably, these surfaces can be made to be highly efficient, conserve polarization, and operate at or around optical frequencies. FIGS. 2A-2B illustrate a prior art reflectarray metasurface that is configured to impact wavelengths at optical frequencies. In particular, the metasurface 202 includes constituent antenna elements 204 that are sized to cause a particular phase shift. A detailed view of a sub-cell 206 is also illustrated, and depicts that the sub-cell includes an antenna element 208 disposed on a dielectric layer 210, which itself is disposed on a metallic film 212. More specifically, the depicted prior art structure utilizes antenna elements 208 fabricated from gold, dielectric layers 210 fabricated from MgF$_2$, and a metallic film 212 fabricated from gold. The thickness of the gold antenna is approximately 30 nm; the thickness of the dielectric layer is approximately 50 nm; and the thickness of the gold film is approximately 130 nm. The working wavelength of the depicted structure is approximately 850 nm. Note that FIG. 2A also illustrates that when the metasurfaces is illuminated with light having a normal angle of incidence 222, the reflected light 224—counterintuitively—reflects at an angle. Such is the effect of metasurfaces.

FIG. 2B illustrates a plot of the reflection angle as a function of the angle of incidence. The shaded area 252 indicates the region where the incident light is counterintuitively reflected back towards itself. Note that the plot indicates that there is a critical angle above which there is no reflection.

Based upon the above overview of metasurface physics and behavior, opto-electrically tunable metasurfaces that provide dynamic control over the propagation of electromagnetic waves at wavelengths at or below 10 μm including (but not limited to) optical and/or near-IR waves in accordance with embodiments of the invention are now discussed below.

Electrically Tunable Metasurfaces for Controlling the Propogation of Electromagnetic Waves having Wavelengths Less than Approximately 10 μm In many embodiments, electrically tunable metasurfaces for controlling the propagation of electromagnetic ("EM") waves having wavelengths less than approximately 10 μm—e.g. including near infrared EM waves and visible EM waves—where electric fields can be locally applied to dynamically augment the electromagnetic response characteristics of the metasurface. As can be appreciated from the above discussion, the electromagnetic response of metasurfaces is strongly correlated with the geometry of the structure (e.g. the geometry of implemented resonators). As can also be appreciated, the electromagnetic response is also a function of the constituent materials of the metasurface. In general, the structure and composition of metasurfaces can be tailored to implement desired electromagnetic response characteristics by selectively implementing particular structures/compositions that can give rise to the desired electromagnetic response characteristics. Many embodiments of the instant invention further leverage the new understanding that the localized carrier concentration within the conductor of a conductor-dielectric composite within a plasmonic metasurface can also influence the electromagnetic response characteristics of the metasurface. Thus, in many embodiments of the invention, a metasurface includes an array of subwavelength antenna elements and a conductor-dielectric interface in an arrangement that causes the metasurface to respond to EM waves having wavelengths of less than 10 μm, where the application of an electric field augments the electromagnetic response characteristics of the metasurface. It is believed that the applied electric field causes the carrier concentration at the surface of the conductor-dielectric interface to vary, which in turn modifies the metasurface's electromagnetic response characteristics.

Figure 3A:
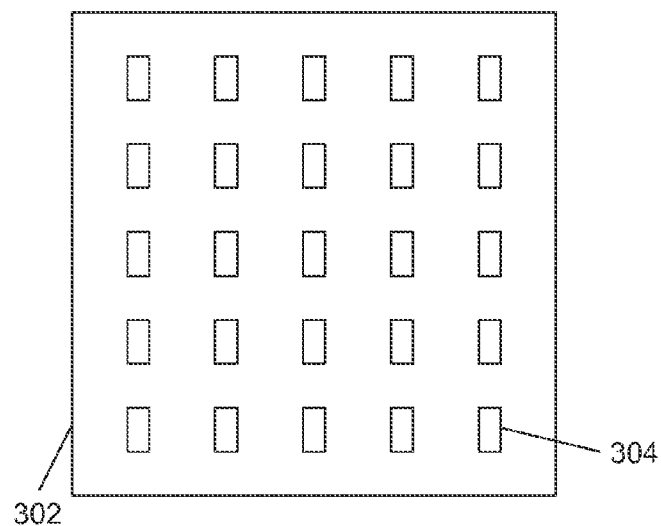
FIGS. 3A-3B illustrate an electrically tunable metasurface reflectarray including rod-shaped subwavelength antenna elements in accordance with certain embodiments of the invention.
Figure 3B:
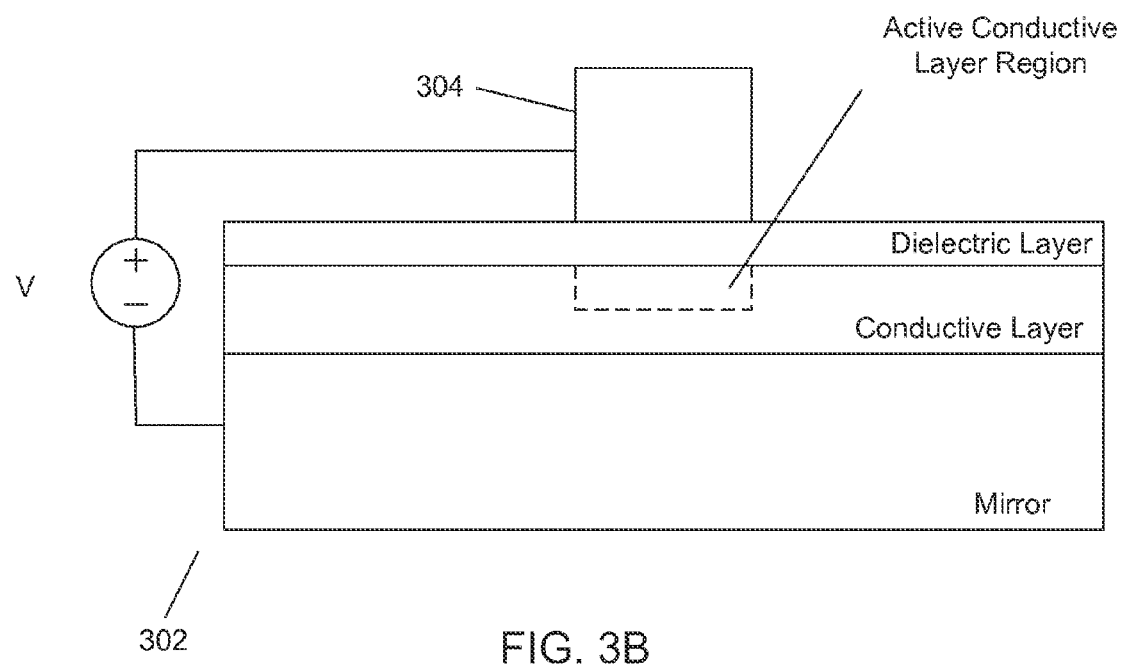

For instance, in many embodiments, electrically tunable metasurface reflectarrays are implemented. For example, FIGS. 3A-3B illustrate an electrically tunable metasurface reflectarray that incorporates an array of rod-shaped subwavelength antenna elements. In particular, FIG. 3A illustrates a top-down view of the metasurface 302 that includes an array of rod-shaped subwavelength antenna elements 304. FIG. 3B illustrates a portion of a cross-sectional view of the metasurface 302 that includes a subwavelength antenna element 304. In particular, it is depicted that the electrically tunable metasurface reflectarray is characterized by an underlying mirror, upon which a conductive layer is disposed, upon which a dielectric layer is disposed. In the illustrated embodiment, the subwavelength antenna element is disposed on the dielectric layer. When an electric field is locally applied to the metasurface, the electromagnetic response characteristics can vary as a consequence; it is believed that the application of the electric field modifies the charge carrier concentration within the conductive layer at the conductor-dielectric interface—i.e. within the active conductive layer region, and that this is what gives rise to the change in the electromagnetic response of the metasurface. In the illustrated embodiment, it is depicted that a potential difference is directly applied between the mirror and the subwavelength antenna element, establishing an electric field. Note that potential differences can be established in any of a variety of ways in accordance with embodiments of the invention. In many embodiments one or more electrical power sources are used to establish potential differences between the subwavelength antenna elements and the mirrored surface. In many embodiments an electrical power source can establish a plurality of potential differences between a respective plurality of the subwavelength antenna elements and the mirrored surface. Any of a variety of circuitry can be used to accomplish the application of potential difference(s) across the electrically tunable metasurface in accordance with embodiments of the invention. While the application of potential differences has been discussed, it should be clear that an electric field can be established across electrically tunable metasurfaces in any of a variety of ways in accordance with many embodiments of the invention.

Figure 4:
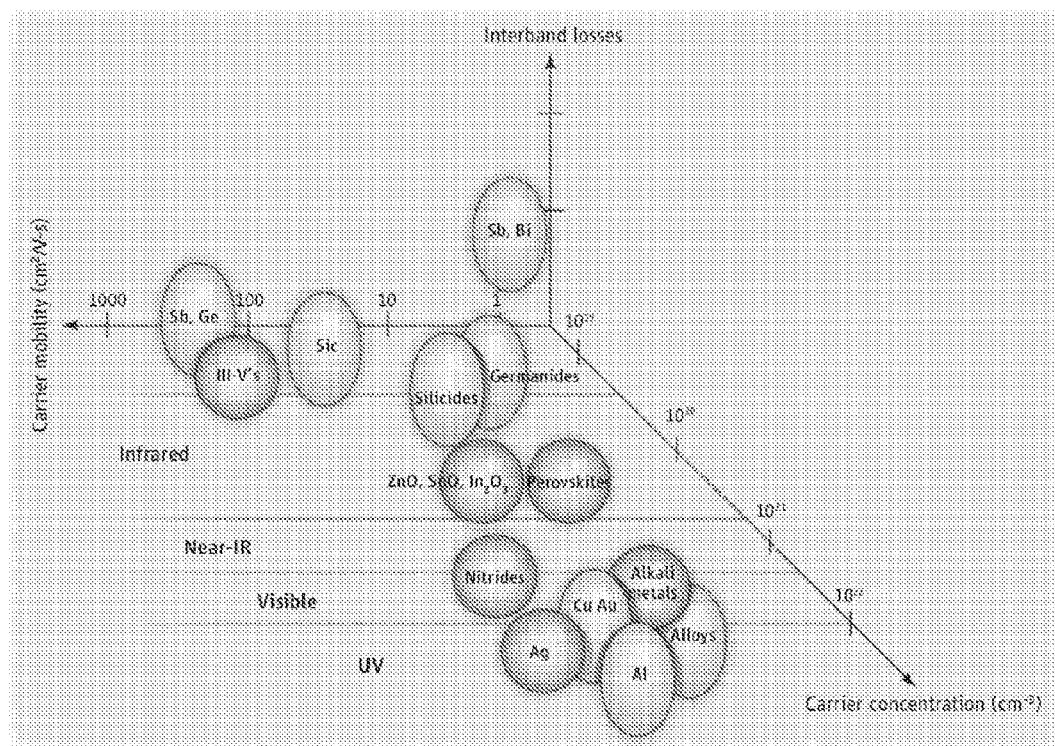
FIG. 4 illustrates prospective materials that can be implemented within a metasurface in accordance with certain embodiments of the invention.

Additionally, as can be appreciated, the particular geometry of the subwavelength antenna elements, and the thickness of the dielectric and conductive layers can be chosen based on the desired electromagnetic response characteristics. Moreover, the particular materials implemented within the layers and subwavelength antenna elements can also impact the electromagnetic response characteristics of the metasurface reflectarray. Thus, as can be appreciated, the materials selected for forming the metasurface reflectarray can also be based on the desired electromagnetic response. For instance, in some embodiments, the conductive layer includes one of: indium tin oxide, graphene, a conducting nitride, and titanium nitride. "Low-Loss Plasmonic metamaterials", by Boltasseva et al. (*Science* 331, 290 (2011); DOI: 10.1126/science. 1198258), discloses considerations in the selection of materials for implementation within metamaterials. "Low-Loss Plasmonic Metamaterials" is hereby incorporated by reference in its entirety, especially as it discloses considerations in the materials selection process in the formation of metamaterials. FIG. 4, extracted from "Low-Loss Plasmonic Metamaterials" illustrates several materials that can be utilized in the implementation of metasurface reflectarrays based on the targeted electromagnetic wavelengths. Similarly, any suitable dielectric layer can be implemented. For example, in many embodiments a dielectric oxide is implemented. In several embodiments, Aluminum Oxide (Al$_2$O$_3$) is implemented as the dielectric layer. Any suitable material referenced in FIG. 4 can be utilized in the implementation of metasurface reflectarrays in accordance with embodiments of the invention. In some embodiments, the implemented materials are those that are compatible with existing manufacturing infrastructure. For instance, in many embodiments the material of the conductive layer is one that can readily be incorporated in modern day semiconductor fabrication houses. In general, as can be appreciated, the metasurface depicted in FIGS. 3A-3B can be modified in any of a variety of ways based on the desired electromagnetic response characteristics and desired operation in accordance with many embodiments of the invention.

In many embodiments, a plurality of subwavelength antenna elements are in contact with a single conductive element so that they are held at the same electric potential. In this arrangement, electric fields may be able to be more easily established—e.g. a potential difference can more easily be applied between the plurality of subwavelength antenna elements and the mirror. For instance, FIGS. 5A-5C illustrate a metasurface reflectarray that includes rows of subwavelength antenna elements, each connected by a single respective conductive element. In particular, FIG. 5A illustrates an isometric view of the electrically tunable metasurface reflectarray. More specifically, FIG. 5A illustrates the metasurface 502, that includes rod-shaped subwavelength antenna elements 504, which are connected by a conductive element 506, and are thus held at the same electric potential. Thus, FIG. 5A illustrates that a voltage is applied between the underlying mirrored surface and the first row of subwavelength antenna elements, and that his voltage can be used to locally modify the electromagnetic response characteristics. In many embodiments, different phases can be applied to adjacent rows of subwavelength antenna elements to perform optical beamsteering. In other embodiments, voltages can be applied to modify the phase across the wavefront of reflected light in any manner appropriate to the requirements of a specific application. FIG. 5B illustrates a scanning electron microscope (SEM) image of the electrically tunable metasurface reflectarray depicted in FIG. 5A.

FIG. 5C illustrates a portion of the cross-section of the electrically tunable metasurface reflectarray seen in FIGS. 5A-5B. In particular, it is depicted that the metasurface reflectarray is characterized by an underlying gold mirror, upon which an ITO layer is disposed, upon which an aluminum oxide—$Al_2O_3$—dielectric layer is disposed. The gold subwavelength antenna elements 504 are disposed on top of the $Al_2O_3$ dielectric layer.

The geometry of the illustrated embodiment is characterized as follows: the gold mirror is 130 nm thick; the ITO layer is 16 nm thick; the aluminum oxide layer is 5 nm thick, and the spatial dimensions of the subwavelength antenna elements are 180 nm×60 nm×50 nm. Accordingly, the described geometry and composition of the structure, establish a magnetic resonance at an electromagnetic wavelength of 1265 nm.

FIG. 5C also depicts that a potential difference is applied between the subwavelength antenna element and the gold mirror. This allows for the application of an electric field across the ITO-$Al_2O_3$ interface. As will be elaborated on in greater detail below, it is believed that the electric field causes a variation in carrier concentration at the ITO-$Al_2O_3$ interface, which in turn can augment the electromagnetic response characteristics in a desired manner. In other words, it is believed that the electric field causes the development of an 'active ITO' region having a different charge carrier concentration, which is depicted in FIG. 5C, that locally augments the electromagnetic response characteristics. However, it should be clear that embodiments of the invention are not constrained to the actual realization of this phenomenon. It has been experimentally verified that the electromagnetic response characteristics of this described metasurface, which is configured for near infrared EM waves, can be tuned using an electric field.

While a specific example of a metasurface reflectarray has been illustrated in FIGS. 5A-5C and described above, it should be clear that embodiments of the invention are not constrained to this specifically described structure. As can be appreciated, the structure can be modified in any of a variety of ways suitable to the desired application of the metasurface. For example, while the metasurface reflectarray includes rows of subwavelength antenna elements held at the same electric potential, in many embodiments, localized electric fields can be applied to individual subwavelength antenna elements, and thereby be used to more precisely modify the electromagnetic response characteristics of the metasurface. For instance in many embodiments, metasurfaces are implemented such that each of a plurality of subwavelength antenna elements is independently addressable using, e.g. control circuitry typically used in a pixelated display. Such a configuration can enable extensively robust control over the localized electromagnetic response characteristics of a metasurface. In this way, the metasurface can be utilized to perform wavefront shaping in any manner appropriate to the requirements of specific applications including (but not limited to) steerable optical beamforming, and holography. Of course, it can be appreciated that electric fields can be locally applied to metasurfaces using any of a variety of techniques in accordance with embodiments of the invention.

Note that where conventional electrical power sources are used to establish a potential difference that gives rise to an electric field, power is only significantly consumed when the changing of the electric field is desired; comparatively little power is used in sustaining the electric field. Thus, the described electrically tunable metasurfaces can be made to be relatively energy efficient.

Additionally, as can be appreciated, while subwavelength antenna elements having specific dimensions and geometries have been discussed above, it should be clear that any of a variety of antenna geometries can be implemented in accordance with embodiments of the invention. In some embodiments V-shaped antenna elements are implemented. In a number of embodiments, split ring resonators are implemented. In several embodiments, rods are implemented as antenna elements. As can be appreciated, the particularly implemented antenna elements can be based on the desired electromagnetic response characteristics for the metasurface.

Figure 6:
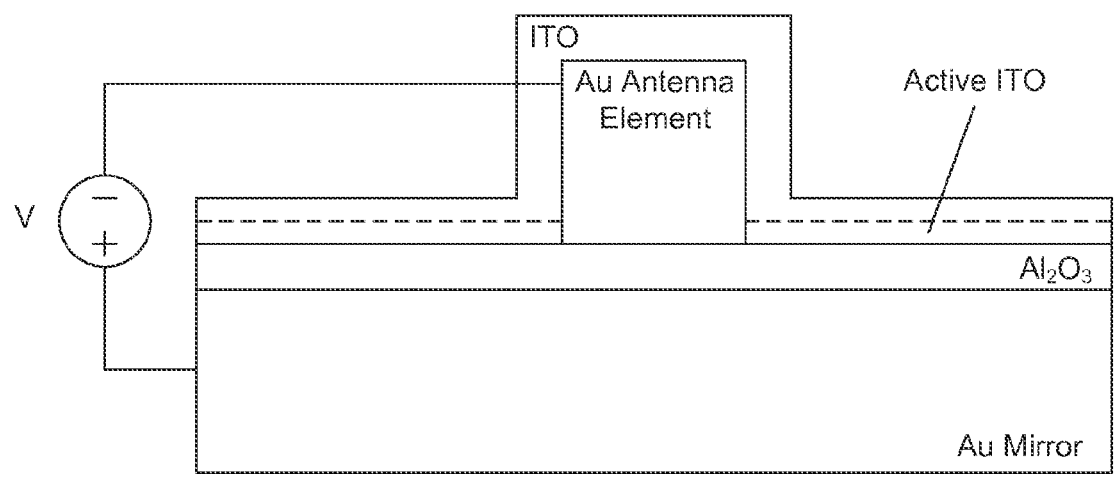
FIG. 6 illustrates a bottom-gated electrically tunable metasurface in accordance with an embodiment of the invention.

Moreover, while a specific layering configuration has been discussed, it should also be clear that any suitable configuration that allows for the implementation of a metasurface including a conductor-dielectric interface that provides a tunable refractive index based upon an applied electric field can be implemented in accordance with various embodiments of the invention. For instance, FIG. 6 illustrates a portion of a cross-section of a bottom-gated electrically tunable metasurface in accordance with an embodiment of the invention. The metasurface is similar to that seen in FIGS. 5A-5C, except that the antenna is embedded within the $Al_2O_3$ layer and the ITO layer. In particular, FIG. 6 illustrates that the metasurface is characterized by an underlying gold mirror, upon which an $Al_2O_3$ layer is disposed, upon which a gold subwavelength antenna element is disposed. An ITO layer is disposed on the $Al_2O_3$ layer, and covers the subwavelength antenna element. In the illustrated embodiment, the $Al_2O_3$ layer is 10 nm thick, the ITO layer is 15 nm thick, and the gold subwavelength antenna element is 50 nm thick. Additionally, the planar dimensions of the gold subwavelength antenna element is 60 nm×90 nm. Note also that a potential difference is applied in an opposing fashion relative to the conventional application of a potential difference. Of course, as before, while certain dimensions are mentioned, it should be clear that any of a variety of geometries suitable to achieve the desired electromagnetic response can be implemented in accordance with embodiments of the invention. More generally, any of a variety of layering configurations can be implemented.

The believed operation dynamics of these described electrically tunable metasurfaces will now be discussed below.
The Operation of Electrically Tunable Metasurfaces Configured to Respond to Near Optical Frequency Electromagnetic Waves The believed dynamics of the above-described metasurface tunability are understood as follows. When an electric field is applied across the described electrically tunable metasurfaces, the carrier concentration at the conductor-dielectric interface increases is believed to increase and forms an accumulation layer. Consequently, this results in modification of the complex permittivity, which in turn is related to a change in the phase and amplitude of the reflected light.

Figure 7A:
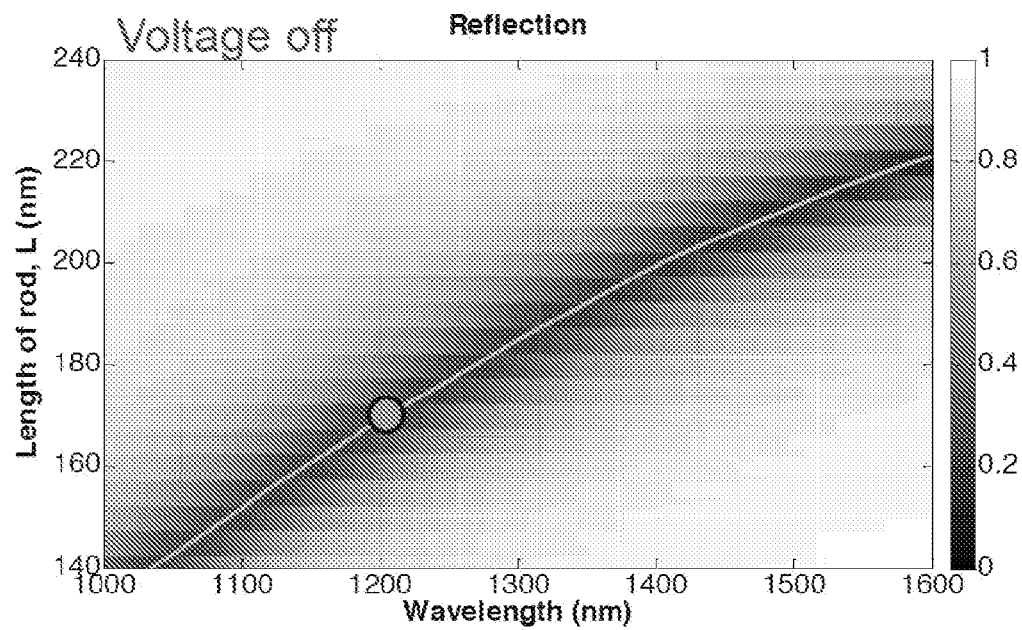
FIGS. 7A-7C illustrate data demonstrating a resonance split with the application of a potential difference, which can be exploited in accordance with certain embodiments of the invention.
Figure 7B:
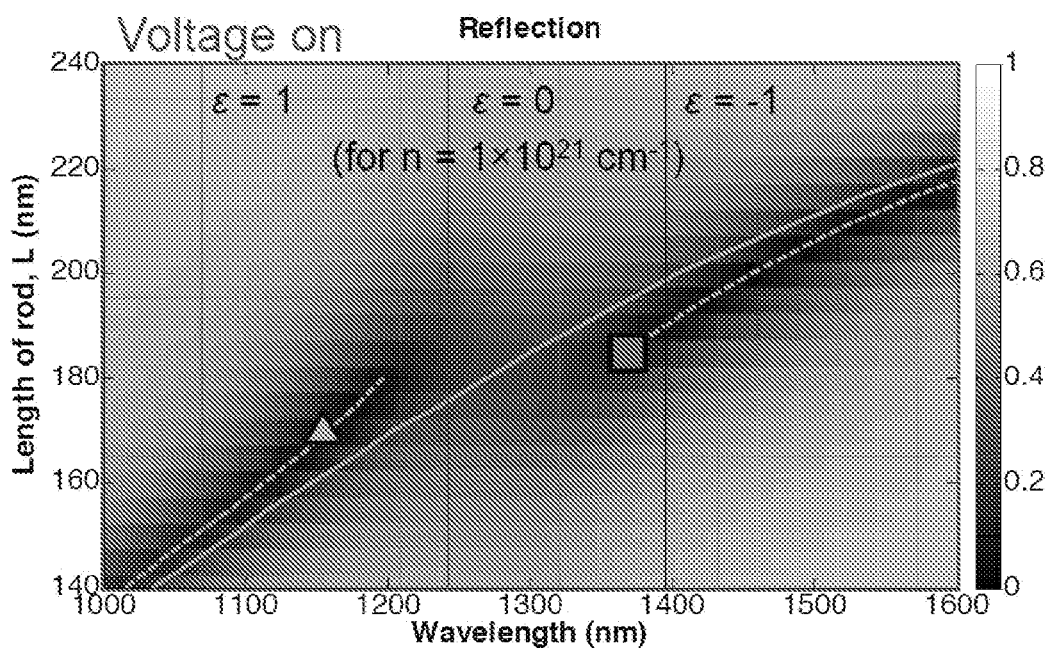
Figure 7C:
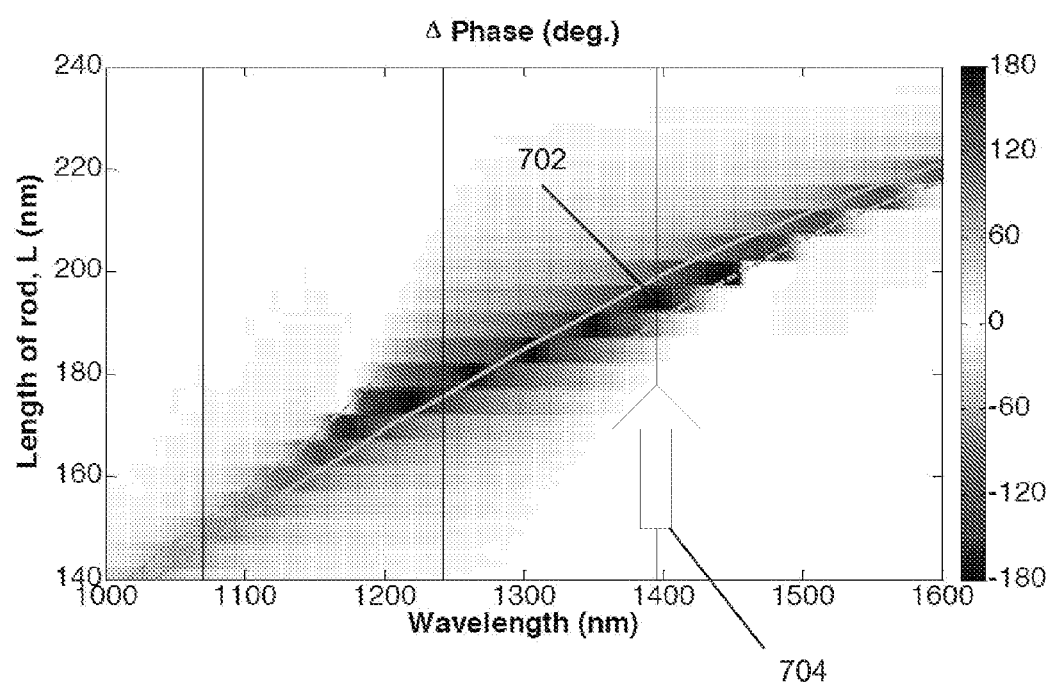

For example, with respect to the metasurface reflectarray described above with respect to FIGS. 5A-5C, using a Drude model to parameterize the ITO permittivity, it can be shown that when the carrier concentration in the accumulation layer of the ITO varies from $2\times10^{20}$ cm$^{-3}$ to $1\times10^{22}$ cm$^{-3}$, the real part of the dielectric permittivity of the active layer of the ITO can cross zero in the wavelength range between approximately 0.5 μm and 3 μm. When the epsilon-near-zero (ENZ) condition is approached, a large electric field enhancement in the accumulation layer of the ITO is observed, which can readily be understood from the boundary condition imposing continuity of the electrical displacement at the interface of two materials with differing permittivities. Accordingly, it is observed that the coupling of the ENZ resonance of the ITO with the gap plasmon resonance of the metasurface results in a resonant frequency splitting that can be used for phase and amplitude modulation. This can be illustrated by calculating the reflection coefficient and phase shift of a plane wave reflected from a metasurface. If we assume that the carrier concentration in the bulk ITO is $1\times10^{19}$ cm$^{-3}$ and is $1\times10^{21}$ cm$^{-3}$ in the accumulation layer of the ITO when the voltage is turned on, resonant frequency splitting can be observed. FIG. 7A shows that when the voltage is off, the magnetic resonance of a metasurface varies from 1000 nm to 1600 nm for subwavelength antenna elements constructed with lengths from 140 to 220 nm. When the voltage is turned on, the plasmonic magnetic resonance couples with the ENZ region of the active ITO layer, resulting in the splitting of the magnetic resonance into two resonances. FIG. 7B depicts this resonance splitting. In particular, the wavelength regime where the real part of the permittivity, $\in_r$, varies from −1 to 1 is highlighted. At the wavelengths where the ENZ condition is approached in the accumulation layer of the ITO, an enhancement of the z-component of the electric field $E_z$ in the active ITO layer can be observed. When $\in_r$ is greater than 0, $E_z$ in the accumulation layer of the ITO is parallel to $E_z$ in the aluminum oxide and the background ITO. However, when $\in_r$ is less than zero in the accumulation layer, the z-component becomes antiparallel to the $E_z$ of the surrounding media. FIG. 7C illustrates the phase shift that occurs when the charge carrier concentration in the active region of the ITO changes from $1\times10^{19}$ cm$^{-3}$ to $1\times10^{21}$ cm$^{-3}$ In particular, the dark regions 702 correspond to a 180° phase shift, which overlaps with a −180° phase shift; the arrow 704 indicates a positive change in phase shift. For example, starting from the bottom of the arrow 704 and moving in the direction of the arrow, the change in phase is from 0° to 180° at the point the dark region 702 is reached—which is equivalent to a −180° phase shift. Continuing in the direction of the upward arrow 704 from the dark region 702, the phase shift is from −180° to 0°.

Figure 8A:
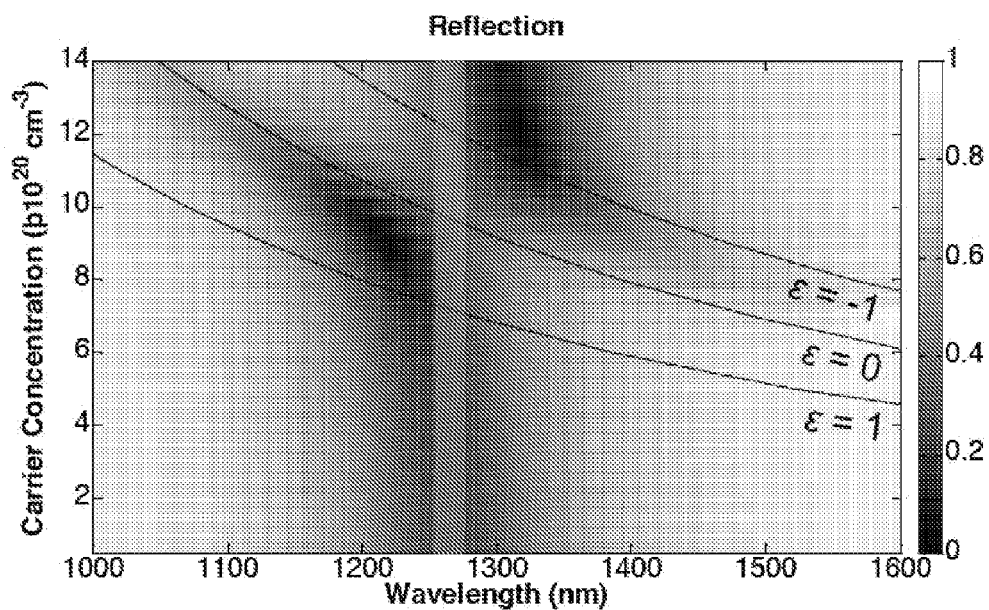
FIGS. 8A-8B illustrate how reflection and phase shift can vary as functions of charge carrier concentration and wavelength in accordance with certain embodiments of the invention.
Figure 8B:
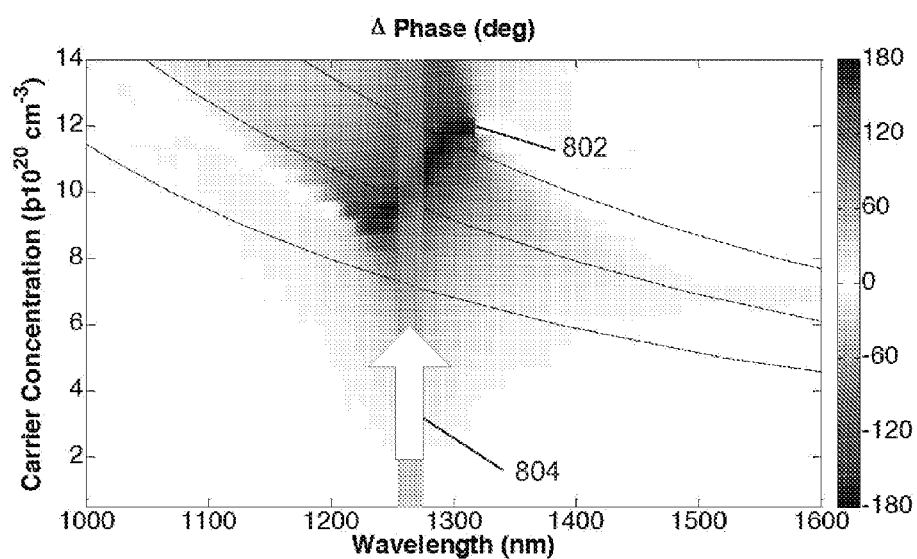

FIGS. 8A and 8B illustrate how the reflectance and phase shift vary as functions of wavelength and charge carrier concentration. In particular, FIG. 8A illustrates reflection as a function of carrier concentration and wavelength. FIG. 8B illustrates phase shift as a function of carrier concentration and wavelength. Similar to before, the dark regions 802 correspond to a 180° phase shift, which overlaps with a −180° phase shift; the arrow 804 indicates a positive change in phase shift. For example, starting from the bottom of the arrow 804 and moving in the direction of the arrow, the change in phase is from 0° to 180° at the point the dark region 802 is reached—which is equivalent to a −180° phase shift. Continuing in the direction of the upward arrow 804 from the dark region 802, the phase shift is from −180° to 0°.

Figure 9A:
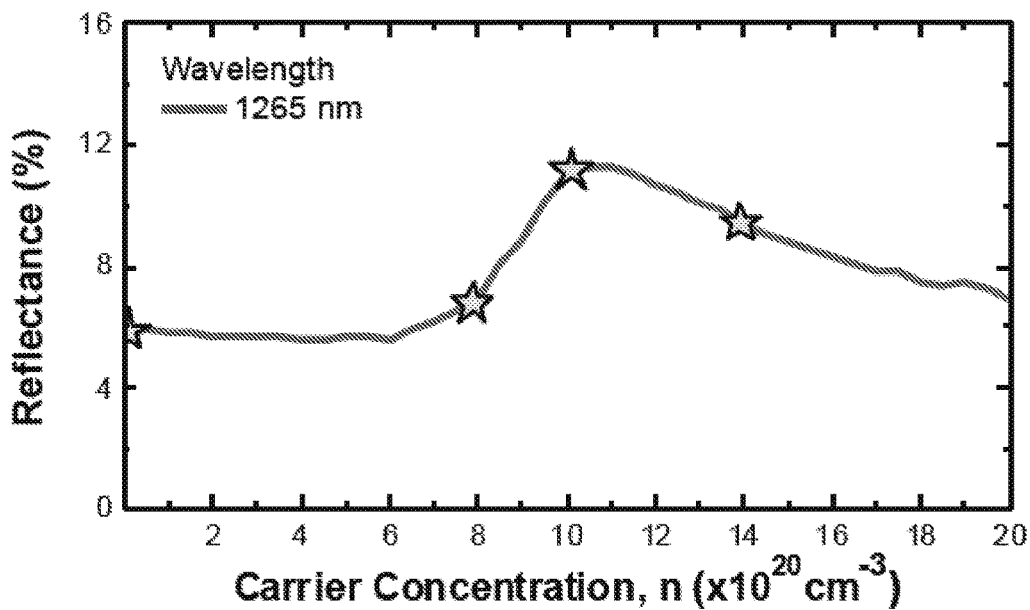
Figure 9B:
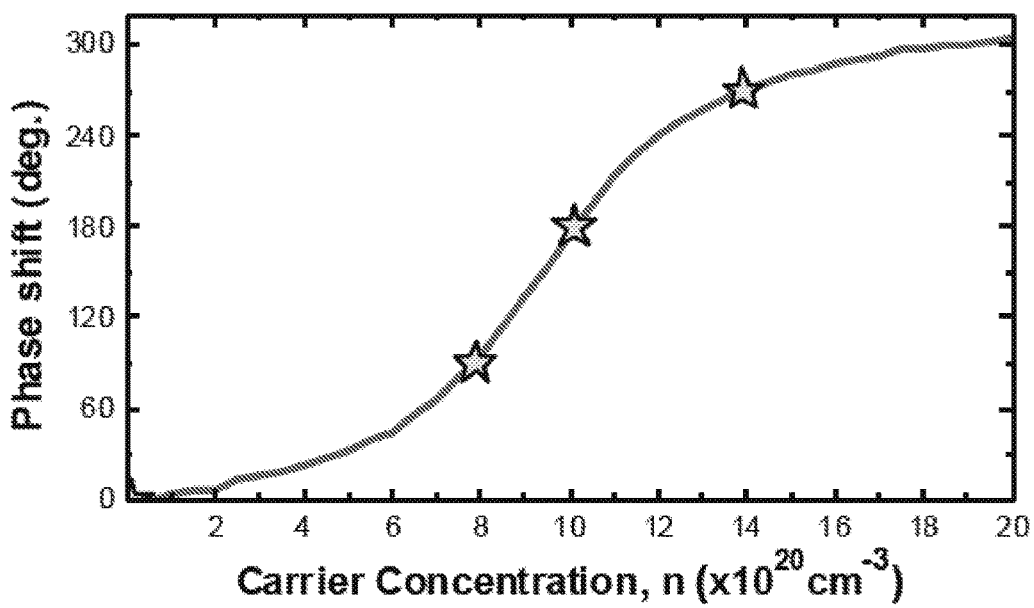

FIGS. 9A and 9B depict how, for the metasurface illustrated in FIGS. 5A-5C, the reflectance efficiency and the phase can be shifted as a function of carrier concentration. In particular, FIG. 9A illustrates the reflectance efficiency as a function of carrier concentration within the active region of the ITO layer. In general, the reflectance efficiency is relatively invariant to charge carrier concentration. FIG. 9B illustrates the phase shift as a function of carrier concentration. As can be seen, modifying the carrier concentration can be used to implement virtually any desired phase shift. While certain data has been presented for certain parameters, it should be clear that embodiments of the invention are not limited to only those metasurfaces that have characteristics corresponding with those presented in the data. Data can be similarly obtained for any of a variety of electrically tunable metasurfaces in accordance with embodiments of the invention.

The current understanding is that these dynamics underlie the operation of the described electrically tunable metasurfaces. However, as alluded to above, embodiments of the invention are not limited to the actual occurrences of the described dynamics. The scope of the application encompasses the described structures irrespective of the actual dynamics of their operation.

The Fabrication of Electrically Tunable Metasurfaces Configured to Control the Propogation of Electromagnetic Waves having Wavelengths Less than Approximately 10 μm The above described electrically tunable metasurfaces can be manufactured in any of a variety of ways. For example, in many instances, standard e-beam lithography techniques can be used. For instance, the metasurface depicted in FIGS. 5A-5C can be manufactured using the following procedure: a 3 nm thick Ni film can be deposited as an adhesion layer, by thermal evaporation on a quartz glass substrate; thermal evaporation can then be used to deposit the 130 nm thick gold mirror; the 16 nm thick ITO layer can be deposited using sputtering techniques; the 5 nm thick $Al_2O_3$ layer can be grown by atomic layer deposition; a 260 nm PMMA bilayer (PMMA-495K and PMMA-950K) can then be used to coat the oxide surface in preparation for deposition of the subwavelength antenna array; a fishbone structure with a 25 µm×25 µm area, gold connection, and gold pad can be patterned using an e-beam lithography system (Leica Vistec EBPG 5000+) at an acceleration voltage of 100 keV with 100 pA current (for structure) and 50 nA current (for connection and pad); after exposure and development, the 50 nm Au film can be deposited by e-beam evaporation; the resist can thereafter be removed. Of course, while one manufacturing technique has been described, any suitable manufacturing techniques for implementing the above-described structures can be implemented in accordance with embodiments of the invention, and they can be used to fabricate electrically tunable metasurfaces having any of a variety of compositions and any of a variety of geometries. It should not be misinterpreted that the described electrically tunable metasurfaces can only be fabricated using the specifically described technique.

As can be inferred from the above discussion, the above-mentioned concepts can be implemented in a variety of arrangements in accordance with embodiments of the invention. For example, any of a variety of subwavelength antenna element geometries can be incorporated, and any of a variety of materials can be used. The selection of geometries and materials can be based on the desired electromagnetic characteristic response for the achieved metasurface. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What claimed is:

1. An electrically tunable metasurface reflectarray comprising:
    a mirrored surface;
    a conductive layer;
    a dielectric layer;
        wherein the conductive layer and the dielectric layer are in direct contact, and thereby define a conductor-dielectric interface;
    a plurality of subwavelength antenna elements; and
    an electrical power source configured to establish a potential difference between at least one subwavelength antenna element and the mirrored surface;
        wherein a potential difference between a subwavelength antenna element and the mirrored surface applies an electric field to a corresponding region of the electrically tunable metasurface reflectarray;
    wherein any applied electric fields in conjunction with the geometry and the material composition of each of the subwavelength antenna elements, the conductive layer, and the dielectric layer, enable the electrically tunable metasurface reflectarray to measurably augment the propagation characteristics of incident electromagnetic waves.

2. The electrically tunable metasurface reflectarray of claim 1 further comprising a second electrical power source configured to establish a second potential difference between at least one other subwavelength antenna element and the mirrored surface.

3. The electrically tunable metasurface reflectarray of claim 1, wherein the electrical power source is configured to establish a plurality of potential differences between a plurality of subwavelength antenna elements and the mirrored surface.

4. The electrically tunable metasurface reflectarray of claim 3, wherein any applied electric fields in conjunction with the geometry and the material composition of each of the subwavelength antenna elements, the conductive layer, and the dielectric layer, enable the electrically tunable metasurface reflectarray to measurably augment the propagation characteristics of incident electromagnetic waves falling within at least some portion of the electromagnetic spectrum characterized by wavelengths of less than 10 µm.

5. The electrically tunable metasurface reflectarray of claim 4, wherein the at least some portion of the electromagnetic spectrum is characterized by electromagnetic waves having wavelengths less than or equal to wavelengths approximately corresponding with those of near infrared electromagnetic waves.

6. The electrically tunable metasurface reflectarray of claim 5, wherein when a region of the electrically tunable metasurface is exposed to an electric field, reflected incident electromagnetic waves falling within the at least some portion of the electromagnetic spectrum exhibit a phase shift based on the magnitude of the applied electric field.

7. The electrically tunable metasurface reflectarray of claim 5, wherein the at least some portion of the electromagnetic spectrum is characterized by electromagnetic waves having wavelengths approximately corresponding with those of near infrared electromagnetic waves.

8. The electrically tunable metasurface reflectarray of claim 5, wherein the at least some portion of the electromagnetic spectrum is characterized by electromagnetic waves having wavelengths less than or equal to wavelengths approximately corresponding with those of visible light.

9. The electrically tunable metasurface reflectarray of claim 8, wherein the at least some portion of the electromagnetic spectrum is characterized by electromagnetic waves having wavelengths approximately corresponding with those of visible light.

10. The electrically tunable metasurface reflectarray of claim 4, wherein:
    the conductive layer comprises one of: a nitride based material; silver; copper; gold; aluminum; an alkali metal; an alloy; a transparent conducting alloy; and graphene.

11. The electrically tunable metasurface reflectarray of claim 4, wherein the conductive layer comprises indium tin oxide.

12. The electrically tunable metasurface reflectarray of claim 11, wherein the dielectric layer comprises a dielectric oxide.

13. The electrically tunable metasurface reflectarray of claim 12, wherein the dielectric layer comprises aluminum oxide.

14. The electrically tunable metasurface reflectarray of claim 13, wherein:
    the mirrored surface comprises gold; and
    at least one of the plurality of subwavelength antenna elements comprises gold.

15. The electrically tunable metasurface reflectarray of claim 14, wherein when a region of the electrically tunable metasurface reflectarray is exposed to an electric field, the charge carrier concentration at the conductor-dielectric interface within that region is altered based on the magnitude of the applied electric field, and this alteration causes a phase shift in reflected incident electromagnetic waves falling within the at least some portion of the electromagnetic spectrum.

16. The electrically tunable metasurface reflectarray of claim 15, wherein a variation in charge carrier concentration from $1\times10^{18}$ cm$^{-3}$ to $1\times10^{22}$ cm$^{-3}$ is sufficient to shift the phase of reflected incident electromagnetic waves falling within the at least some portion of the electromagnetic spectrum by at least $2\pi$.

17. The electrically tunable metasurface reflectarray of claim 15, wherein a variation in charge carrier concentration from $1\times10^{19}$ cm$^{-3}$ to $1\times10^{21}$ cm$^{-3}$ is sufficient to shift the phase of reflected incident electromagnetic waves falling within the at least some portion of the electromagnetic spectrum by at least $2\pi$.

18. The electrically tunable metasurface reflectarray of claim 4, wherein at least one of the plurality of subwavelength antenna elements conforms to a rod-shaped geometry.

19. The electrically tunable metasurface reflectarray of claim 4, wherein at least one of the plurality of subwavelength antenna elements conforms to a V-shaped geometry.

20. The electrically tunable metasurface reflectarray of claim 4, wherein at least one of the plurality of subwavelength antenna elements conforms to a split ring geometry.

21. The electrically tunable metasurface reflectarray of claim 4, wherein at least two of the plurality of subwavelength antenna elements are connected to the same conductive element, which itself is connected to the electrical power source.

22. The electrically tunable metasurface reflectarray of claim 21, wherein rows of subwavelength antenna elements are connected to a respective conductive element, which themselves are connected to the electrical power source.

* * * * *